(12) United States Patent
Fukushima et al.

(10) Patent No.: US 10,110,098 B2
(45) Date of Patent: Oct. 23, 2018

(54) INTEGRATED SYSTEM

(71) Applicant: HONDA MOTOR CO., LTD., Tokyo (JP)

(72) Inventors: Tadahiro Fukushima, Wako (JP); Tsukasa Aiba, Wako (JP); Takahiro Hagimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 331 days.

(21) Appl. No.: 14/996,227

(22) Filed: Jan. 15, 2016

(65) Prior Publication Data

US 2016/0218584 A1    Jul. 28, 2016

(30) Foreign Application Priority Data

Jan. 28, 2015    (JP) .................... 2015-014493

(51) Int. Cl.
| H02K 11/00 | (2016.01) |
| H02K 11/33 | (2016.01) |
| H02K 5/22  | (2006.01) |

(52) U.S. Cl.
CPC ............. H02K 11/33 (2016.01); H02K 5/225 (2013.01)

(58) Field of Classification Search
CPC .......... H02K 11/30; H02K 11/33; H02K 5/22; H02K 5/225
USPC ..................................................... 180/65.21
See application file for complete search history.

(56) References Cited

U.S. PATENT DOCUMENTS

| 7,207,187 B2* | 4/2007 | Funahashi | ............... F01C 21/10 |
| | | | 62/113 |
| 9,531,309 B2* | 12/2016 | Nakao | ....................... H02P 6/14 |
| 2009/0096301 A1* | 4/2009 | Sumi | ...................... H02K 11/33 |
| | | | 310/89 |
| 2014/0306563 A1* | 10/2014 | Oyama | ................... H02M 1/12 |
| | | | 310/71 |

FOREIGN PATENT DOCUMENTS

| CN | 101445124 | 6/2009 |
| JP | 2013-150472 | 8/2013 |

OTHER PUBLICATIONS

Chinese Office Action for corresponding CN Application No. 201610024069.7, dated Nov. 3, 2017 (w/ English machine translation).

* cited by examiner

*Primary Examiner* — John D Walters
(74) *Attorney, Agent, or Firm* — Mori & Ward, LLP

(57) ABSTRACT

An integrated system includes a controller, a drive device, a fastening supporting member, and a fixing member. The controller has a controller connector. The drive device has a drive device connector that is connected to the controller connector so that the drive device is electrically coupled to the controller. Via the fastening supporting member, the controller and the drive device are maintained in an electrically coupled state in which the drive device connector is connected to the controller connector. Via the fixing member, the controller and the drive device are maintained in a mechanically coupled state in which the drive device is mechanically coupled to the controller.

14 Claims, 17 Drawing Sheets

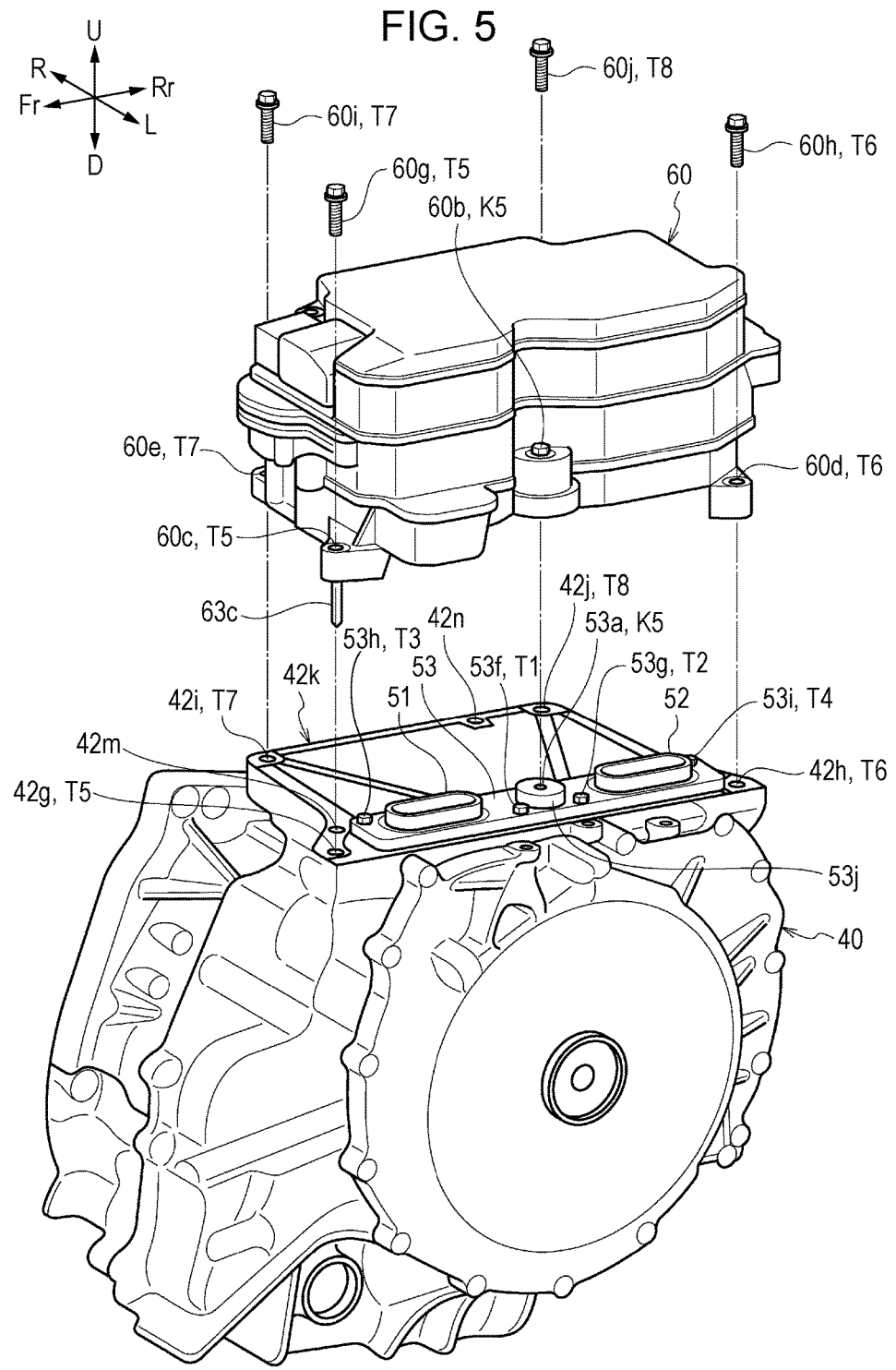

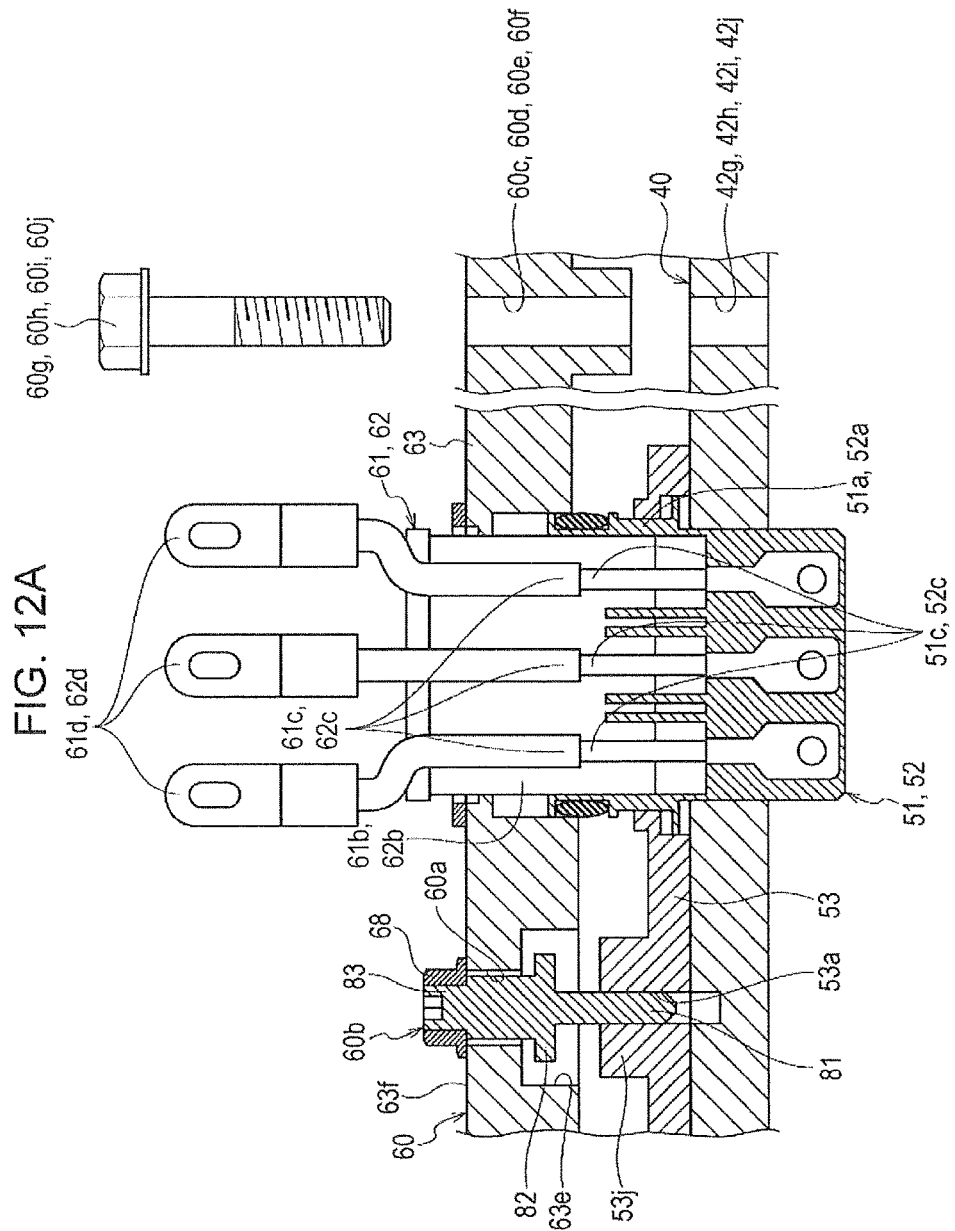

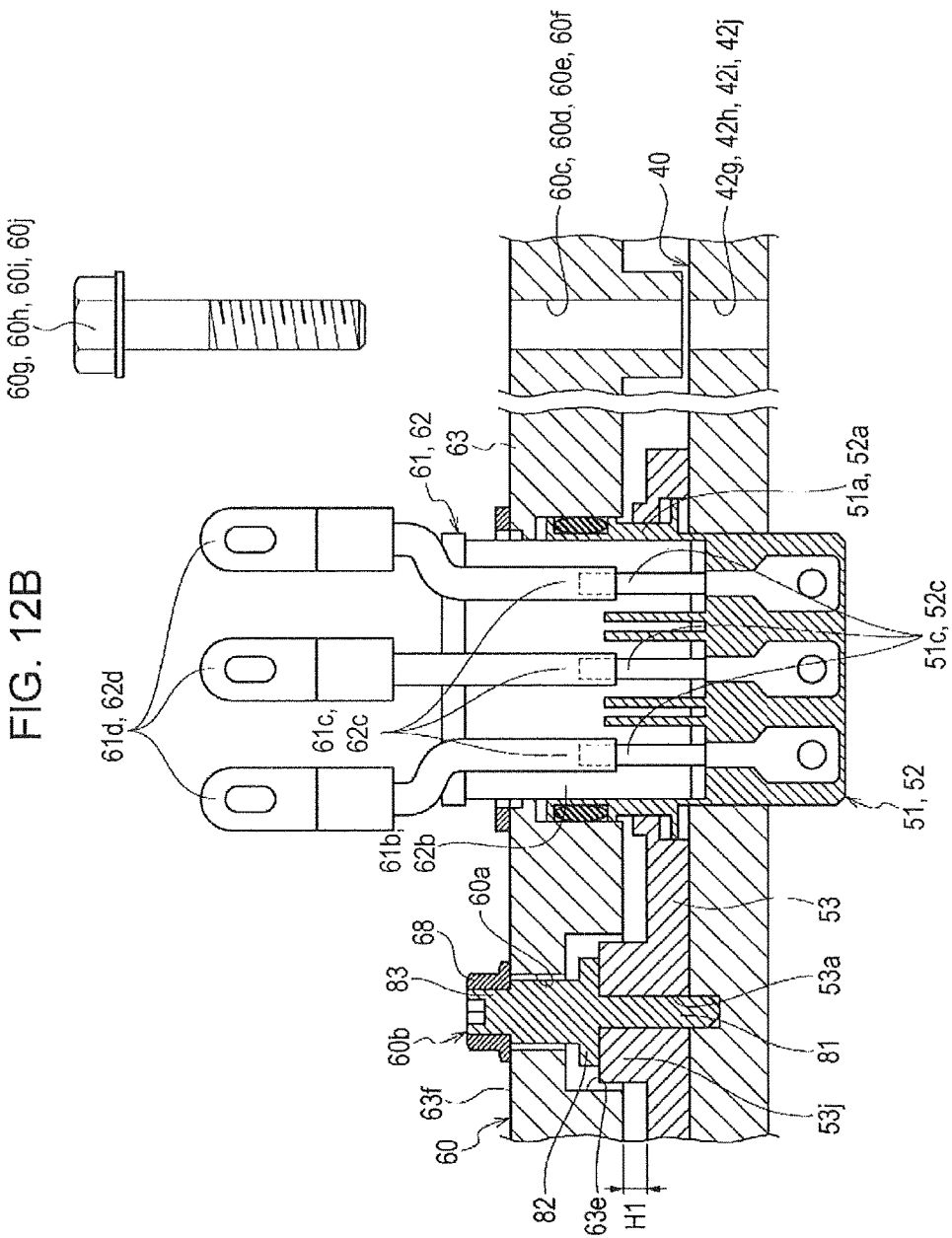

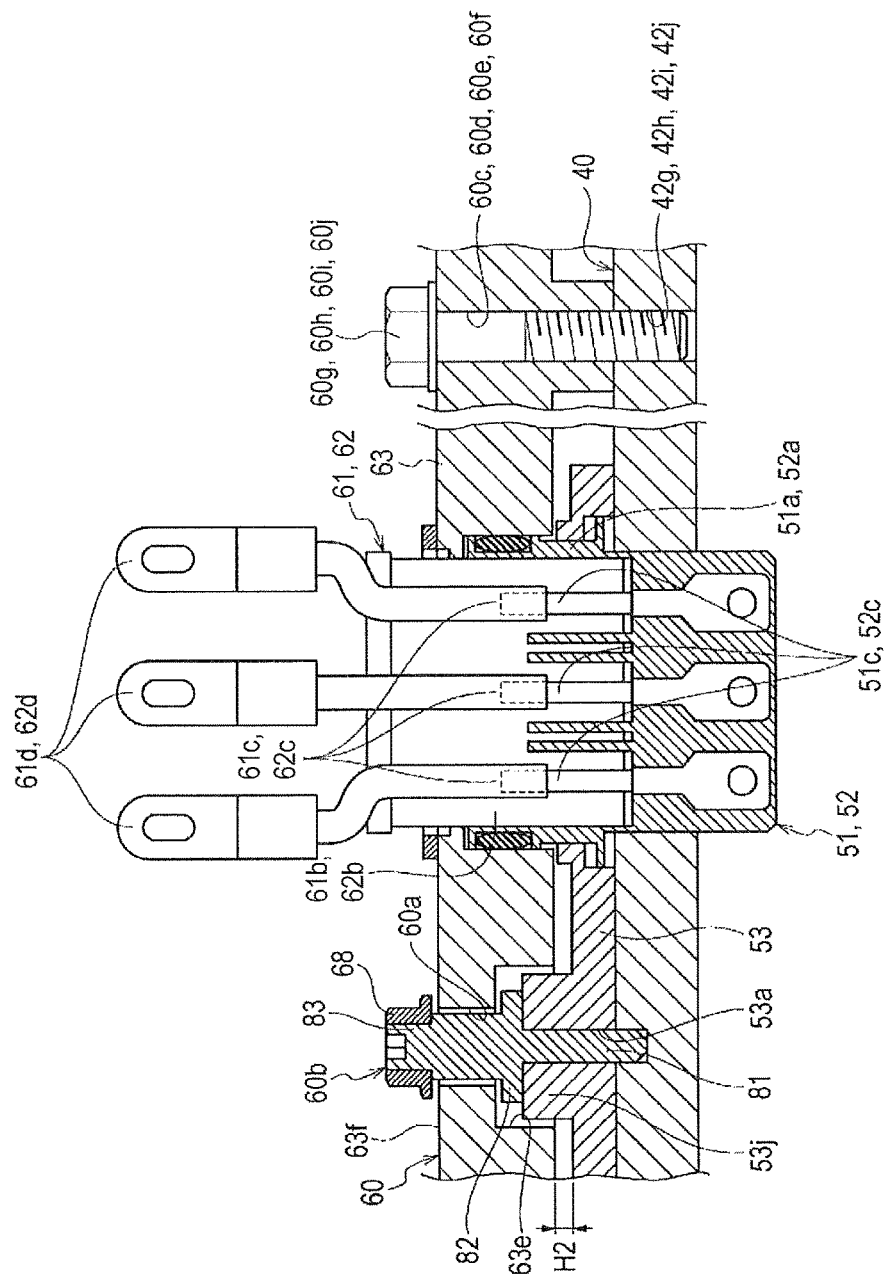

INTEGRATED SYSTEM

CROSS-REFERENCE TO RELATED APPLICATIONS

The present application claims priority under 35 U.S.C. § 119 to Japanese Patent Application No. 2015-014493, filed Jan. 28, 2015, entitled "Integrated Unit." The contents of this application are incorporated herein by reference in their entirety.

BACKGROUND

1. Field

The present disclosure relates to an integrated system.

2. Description of the Related Art

There is known an integrated unit for use in a hybrid vehicle using an internal combustion engine and an electric motor as a driving source and an electric vehicle using an electric motor as a driving source in which the electric motor and a power control unit that controls the electric motor are integrated with each other through disposition of the power control unit on the electric motor (see, for example, Japanese Unexamined Patent Application Publication No. 2013-150472).

Japanese Unexamined Patent Application Publication No. 2013-150472 discloses that an inverter that controls a motor drive unit is mounted on the motor drive unit from above and bolted into a single unit.

SUMMARY

According to one aspect of the present invention, an integrated unit includes a control unit and a controlled unit. The control unit has a control unit connector. The controlled unit has a controlled unit connector that is fitted into the control unit connector and is electrically coupled to the control unit by causing the control unit connector and the controlled unit connector to be fitted into each other. The control unit and the controlled unit are maintained in a coupled state in which electrical coupling is accomplished by a fastening supporting member as well as in a coupled state in which mechanical coupling is accomplished by a fixing member that differs from the fastening supporting member.

According to another aspect of the present invention, an integrated system includes a controller, a drive device, a fastening supporting member, and a fixing member. The controller has a controller connector. The drive device has a drive device connector that is connected to the controller connector so that the drive device is electrically coupled to the controller. Via the fastening supporting member, the controller and the drive device are maintained in an electrically coupled state in which the drive device connector is connected to the controller connector. Via the fixing member, the controller and the drive device are maintained in a mechanically coupled state in which the drive device is mechanically coupled to the controller.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is an exploded perspective view of a hybrid vehicle drive unit of FIG. 1.

FIG. 12A is a cross-sectional view showing an initial state in which a power control unit and a drive unit are installed.

FIG. 12B is a cross-sectional view showing a state in which a power control unit and a drive unit are electrically coupled to each other.

FIG. 12C is a cross-sectional view showing a state in which a power control unit and a drive unit are mechanically coupled to each other.

DESCRIPTION OF THE EMBODIMENTS

Figure 1:
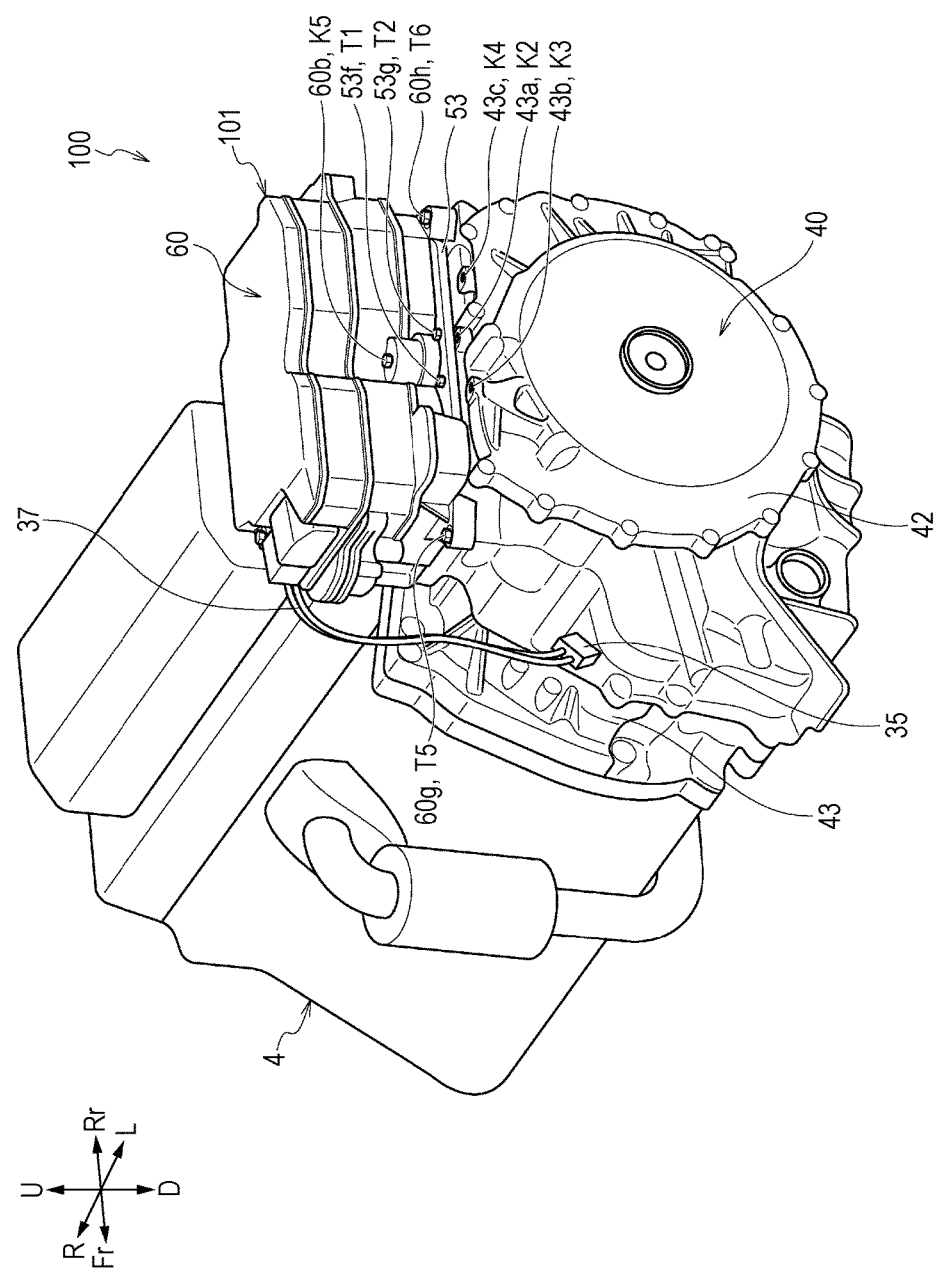
FIG. 1 is a perspective view of a hybrid vehicle drive unit as an integrated unit according to one embodiment of the present application.

The embodiments will now be described with reference to the accompanying drawings, wherein like reference numerals designate corresponding or identical elements throughout the various drawings.

A hybrid vehicle drive unit as an integrated unit (integrated system) according to one embodiment of the present application will be described below with reference to the attached drawings.

<Hybrid Vehicle Drive Unit>

Figure 2:
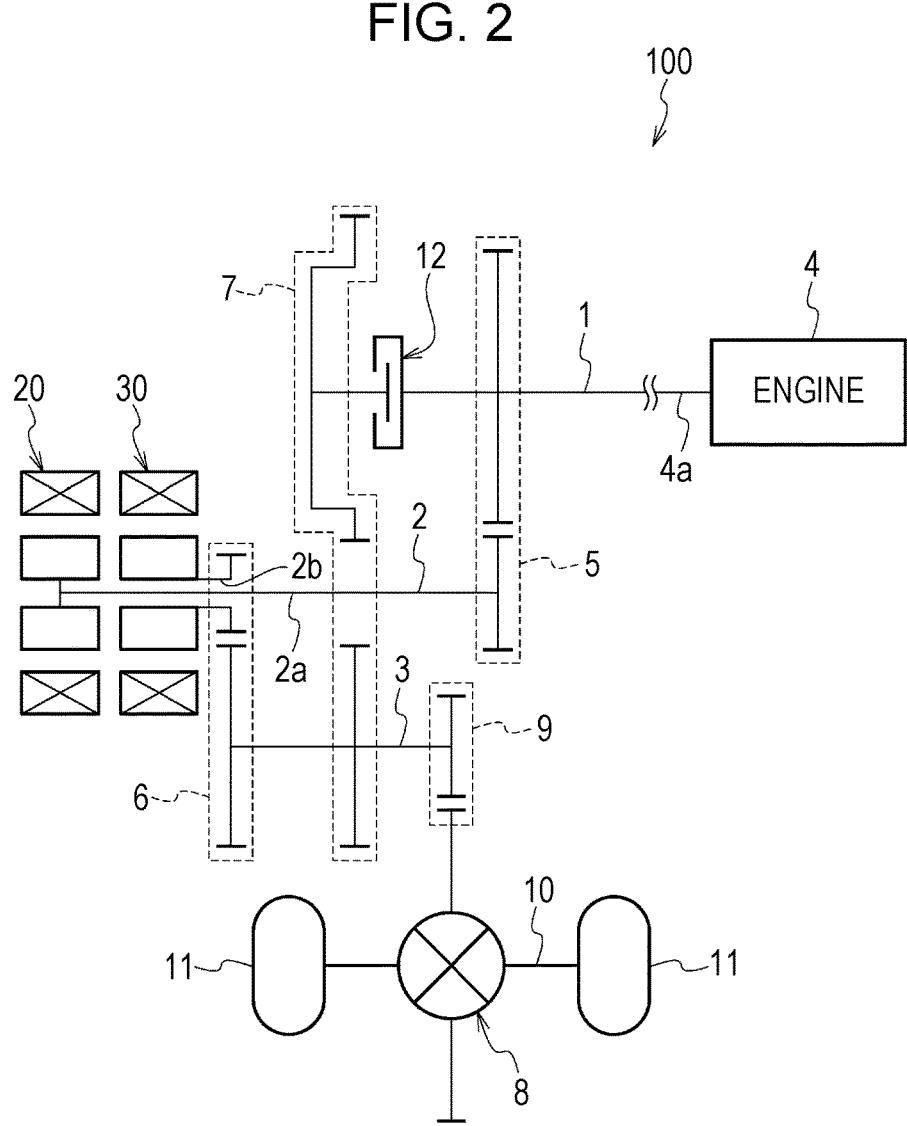
FIG. 2 is a block diagram of a hybrid vehicle drive unit of FIG. 1.
Figure 3:
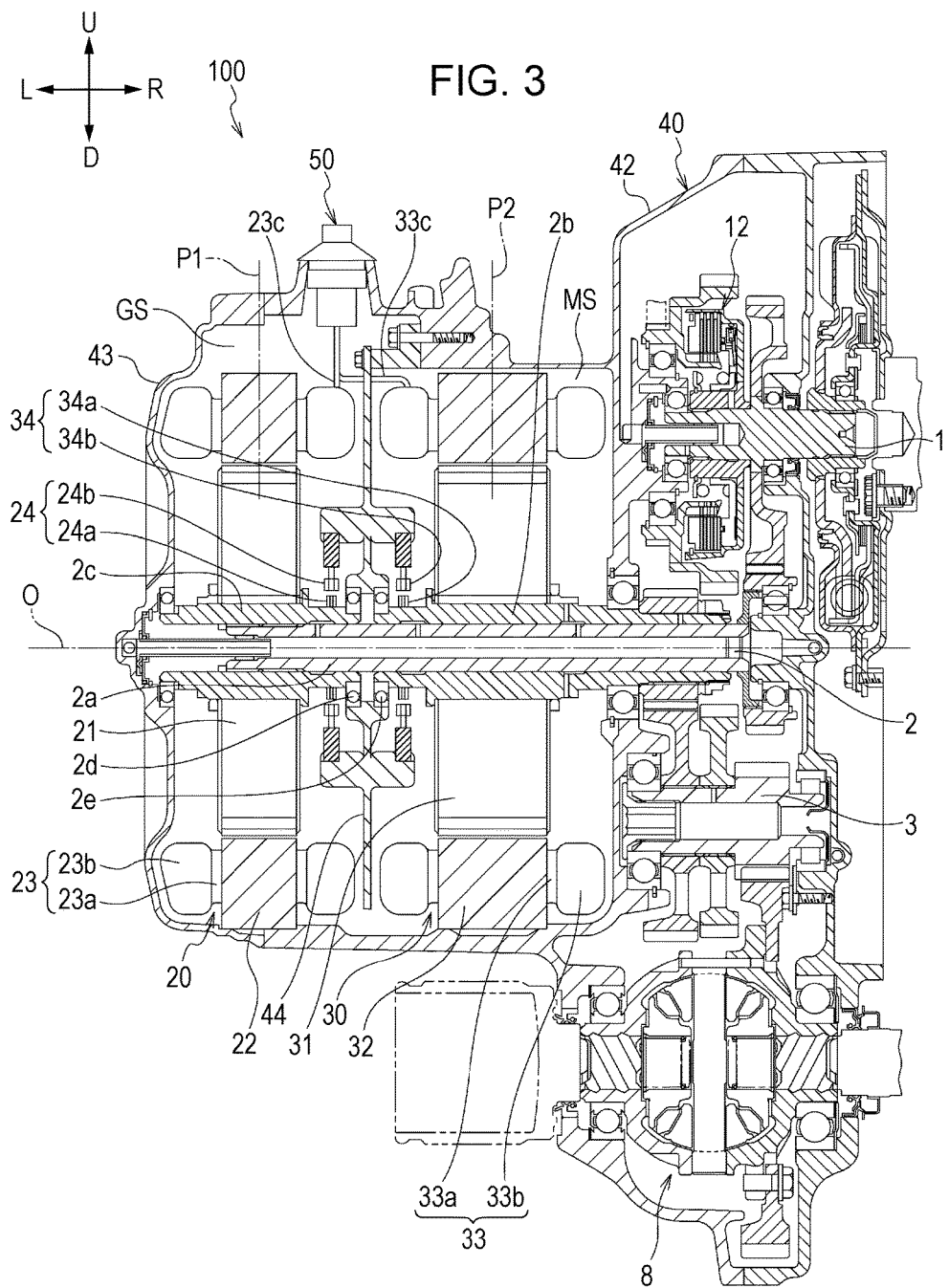
FIG. 3 is a cross-sectional view showing an internal structure of a drive unit casing of a hybrid vehicle drive unit of FIG. 1.

As shown in FIGS. 1 to 3, in a hybrid vehicle drive unit 100 according to one embodiment of the present application, a drive unit (drive device) 101 having a substantially cylindrically-shaped drive unit casing 40 that has a generator 20 and an electric motor 30 housed therein and an engine 4 are disposed side-by-side in an engine compartment (not illustrated), and a power control unit (controller) 60 that controls the generator 20 and the electric motor 30 is mounted on the drive unit casing 40. In FIG. 1, references to "Fr", "Rr", "L", "R", "U", and "D" are relative to a driver's position, representing the vehicle front, vehicle rear, left, right, upside, and downside, respectively.

As shown in FIGS. 2 and 3, an input shaft 1, an intermediate shaft 2, and an output shaft 3 are disposed inside the drive unit casing 40 so as to be parallel to one another. The intermediate shaft 2 has an inner circumferential shaft 2a surrounded by an outer circumferential shaft 2b so as to be relatively rotatable. In the following descriptions, the direction of the axis refers to the direction parallel to the axis of rotation of the input shaft 1, the intermediate shaft 2, and the output shaft 3. The hybrid vehicle drive unit 100 is disposed in the engine compartment in such a manner that the direction of the axis is in the breadthwise (crosswise) direction of the vehicle and that the direction perpendicular to the direction of the axis is the longitudinal direction of the vehicle.

The input shaft 1 connected to a crankshaft 4a of the engine 4 is connected through a generator drive gear pair 5 to the inner circumferential shaft 2a having the generator 20 provided on its axis. The outer circumferential shaft 2b having the electric motor 30 provided on its axis is connected to the output shaft 3 through a motor drive power transmission gear pair 6, while the input shaft 1 and the output shaft 3 are connected to each other through an engine drive power transmission gear pair 7. The output shaft 3 and a differential gear unit 8 are connected to each other through a final gear pair 9, while the differential gear unit 8 is connected to drive wheels 11, 11 through a differential shaft 10. In addition, the input shaft 1 is provided with a clutch 12 that connects or disconnects drive power transmitted between the input shaft 1 and the output shaft 3 through the engine drive power transmission gear pair 7.

With this arrangement, the hybrid vehicle drive unit 100 has a transmission path through which the drive power of the electric motor 30 is transmitted to the drive wheels 11, 11 to drive the vehicle and another transmission path through which the drive power of the engine 4 is transmitted to the wheels 11, 11 to drive the vehicle. The vehicle is driven through the use of any one or the combined use of the two transmission paths.

When an attempt is made to use the transmission path through which the drive power of the electric motor 30 is transmitted to the drive wheels 11, 11 to drive the vehicle, the engine 4 is operated with the clutch 12 disengaged. Engine drive power input to the inner circumferential shaft 2a of the intermediate shaft 2 from the input shaft 1 through the generator drive gear pair 5 rotates the inner circumferential shaft 2a and the generator 20 secured to the inner circumferential shaft 2a as a unit, thereby generating electric power through the generator 20. Upon receiving the electric power generated by the generator 20, the electric motor 30 secured to the outer circumferential shaft 2b that surrounds the inner circumferential shaft 2a so as to be relatively rotatable rotates the outer circumferential shaft 2b and transmits the drive power to the output shaft 3 through the motor drive power transmission gear pair 6. The drive power transmitted to the output shaft 3 is transmitted to the drive wheels 11, 11 through the final gear pair 9, the differential gear unit 8, and the differential shaft 10. By doing this, all of the drive power of the engine 4 is converted into electric power by the generator 20, thereby enabling so-called series operation.

On the contrary, when an attempt is made to use the transmission path through which the drive power of the engine 4 is transmitted to the wheels 11, 11 to drive the vehicle, the engine 4 is operated with the clutch 12 engaged. Engine drive power input through the input shaft 1 is transmitted to the output shaft 3 through the engine drive power transmission gear pair 7 and then transmitted to the drive wheels 11, 11 through the final gear pair 9, the differential gear unit 8, and the differential shaft 10. At this time, since the input shaft 1 and the inner circumferential shaft 2a are normally connected to each other through the generator drive gear pair 5, electric power is generated by the generator 20 and the thus generated electric power is used to rotate the electric motor 30, thereby enabling parallel operation as well. In addition, only the drive power of the engine 4 can be used to run the vehicle by subjecting the generator 20 and the electric motor 30 to zero torque control to minimize drag loss.

Next, the disposition of the generator 20 and the electric motor 30 in the drive unit casing 40 according to the embodiment is specifically described below with reference to FIG. 3.

The drive unit casing 40 according to the embodiment consists of first and second casings 42, 43 that are arranged in this order from the side of the engine 40 and has the input shaft 1, the intermediate shaft 2, and the output shaft 3 disposed therein so as to be parallel to one another. As described above, the intermediate shaft 2 has the inner circumferential shaft 2a and the outer circumferential shaft 2b. The electric motor 30 is connected to the outer circumferential shaft 2b, while the generator 20 is connected to the inner circumferential shaft 2a through a spline-coupled connecting shaft 2c.

In other words, the generator 20 and the electric motor 30 are housed in the drive unit casing 40 so as to be arranged on the same axis of rotation 0. A generator housing GS that has the generator 20 housed therein and a motor housing MS that has the electric motor 30 housed therein are separated by a partition wall 44 that rotatably supports the outer circumferential shaft 2b and the connecting shaft 2c via bearings 2d, 2e.

The generator 20 consists of a rotor 21 secured to the connecting shaft 2c and a stator 22 disposed so as to be opposed to the rotor 21. The stator 22 has coils 23 of three phases (U, V, and W phases) wrapped therearound. The coils 23 have coil windings 23a wrapped around teeth of the stator 22 and a coil transition portion 23b that couples the coil windings 23a to one another. The coil transition portion 23b projects from the stator 22 in the direction of the axis.

The electric motor 30 consists of a rotor 31 secured to the outer circumferential shaft 2b and a stator 32 disposed so as to be opposed to the rotor 31. The stator 32 has coils 33 of three phases (U, V, and W phases) wrapped therearound. The coils 33 have coil windings 33a wrapped around teeth of the stator 32 and a coil transition portion 33b that couples the coil windings 33a to one another. The coil transition portion 33b projects from the stator 32 in the direction of the axis.

A generator resolver 24 that detects a rotational angle of the generator 20 and an electric motor resolver 34 that detects a rotational angle of the electric motor 30 are disposed in the direction of the axis between the generator 20 and the electric motor 30 in the inner-diameter side of the coil transition portion 23b of the generator 20 and the coil transition portion 33b of the electric motor 30.

The generator resolver 24 has a resolver rotor 24a secured to the connecting shaft 2c and a resolver stator 24b disposed so as to be opposed to the resolver rotor 24a, while the electric motor resolver 34 has a resolver rotor 34a secured to the outer circumferential shaft 2b and a resolver stator 34b disposed so as to be opposed to the resolver rotor 34a. The resolver stators 24b, 34b of the generator resolver 24 and the electric motor resolver 34 are supported by the above-mentioned partition wall 44. This arrangement enables the utilization of a dead space in the inner-diameter side of the coil transition portions 23b, 33b to dispose the generator resolver 24 and the electric motor resolver 34 and also enables the partition wall 44 to be shared as a wall for supporting the generator resolver 24 and the electric motor resolver 34. Coils (not illustrated) drawn from the resolver stators 24b, 34b are connected to a resolver connector 35 disposed on the front surface of the drive unit casing 40. The resolver connector 35 and the power control unit 60 are connected to each other through a harness 37.

Figure 4:
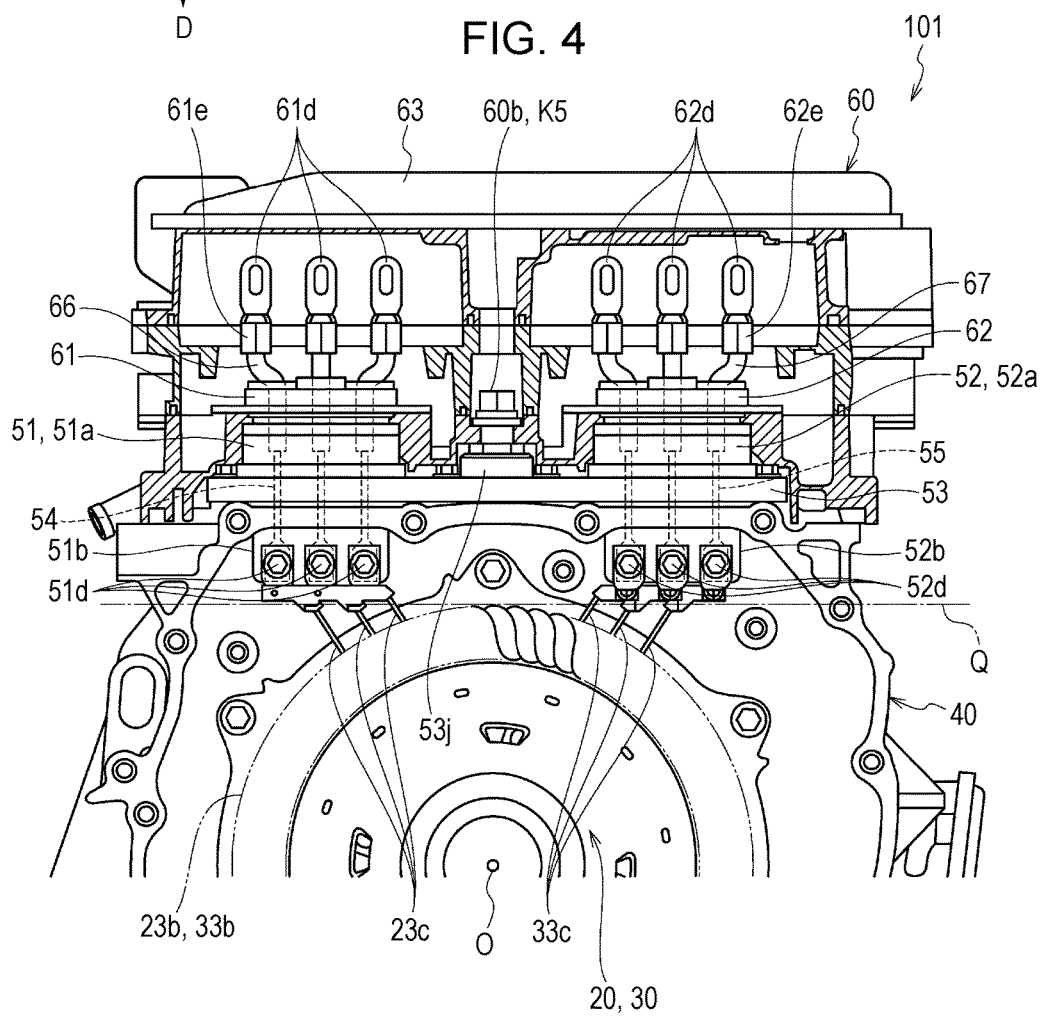
FIG. 4 is a cross-sectional view showing an internal structure of a drive unit casing and a power control unit of a hybrid vehicle drive unit of FIG. 1.

As shown in FIGS. 3 and 4, the coils 23 for the various phases (U, V, and W phases) in the generator 20 are connected at one end thereof to one another. The other ends are drawn as coil terminals 23c from the stator 22 and are connected to a casing-side generator connector 51 inside the drive unit casing 40. In addition, the coils 33 for the various phases in the electric motor 30 are connected at one end thereof to one another. The other ends are drawn as coil terminals 33c from the stator 32 and are connected to a casing-side motor connector 52 inside the drive unit casing 40.

The casing-side generator connector 51 and the casing-side motor connector 52 are disposed between the center P1 of the generator 20 and the center P2 of the electric motor 30 in the direction of the axis so as to be perpendicular to the axis of rotation 0. The casing-side generator connector 51 and the casing-side motor connector 52 according to the embodiment are coupled to each other via a connector supporting member 53, thereby forming an integrated casing-side connector (drive device connector) 50 that is secured to the circumferential surface of the substantially cylindrically-shaped drive unit casing 40 via the connector supporting member 53.

Specifically, as shown in FIGS. 4 through 7C, the casing-side generator connector 51 and the casing-side motor connector 52 according to the embodiment have connectors 51a, 52a projecting from the upper surface of the plate-like connector supporting member 53 and coil connecting portions 51b, 52b projecting from the lower surface of the connector supporting member 53. The connectors 51a, 52a have three casing-side connecting conductors 54 housed therein that correspond to the U, V, and W phases. Likewise, the coil connecting portions 51b, 52b have three casing-side connecting conductors 55 housed therein that correspond to the U, V, and W phases. The connectors 51a, 52a are formed into the shape of a cylindroid in which connector terminals 51c, 52c for the three phases formed at ends of the casing-side connecting conductors 54, 55 are disposed. The coil connecting portions 51b, 52b are also formed into the shape of a cylindroid. Coil connecting terminals 51d, 52d for the three phases formed at the other ends of the casing-side connecting conductors 54, 55 are disposed on an outside surface of the coil connecting terminals 51d, 52d.

The connector supporting member 53 has through-holes 53b, 53c, 53d, 53e formed therein through which bolts 53f, 53g, 53h, 53i are inserted and fastened to fastener holes 42c, 42d, 42e, 42f formed in the drive unit casing 40, thereby forming bolt fastening points T1, T2, T3, T4 between the connector supporting member 53 and the drive unit casing 40.

Figure 11:
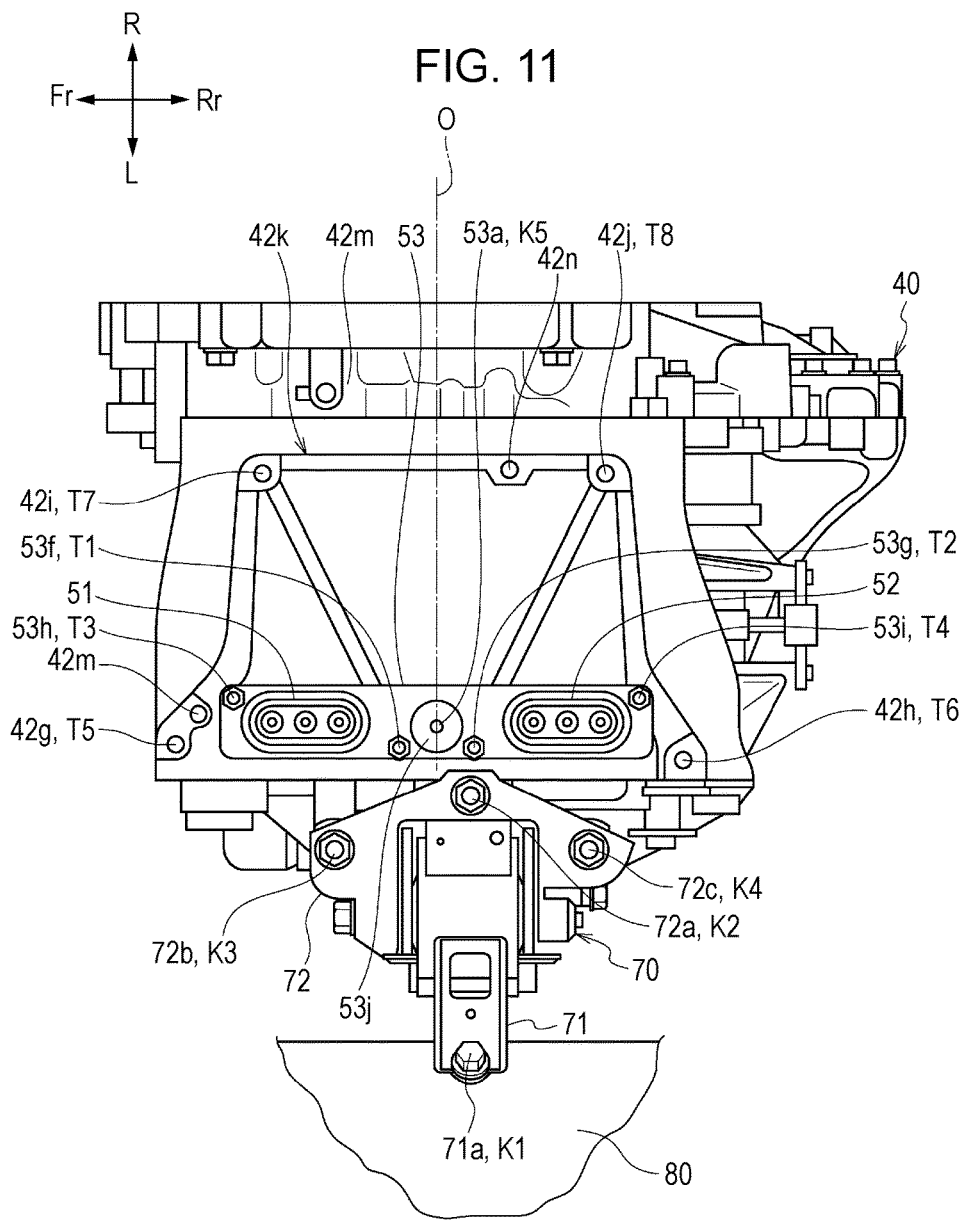
FIG. 11 is a plan view showing a hybrid vehicle drive unit of FIG. 1 having a mounting member mounted on a drive unit casing thereof.

With this arrangement, the casing-side generator connector 51 and the casing-side motor connector 52 according to the embodiment are mounted on the drive unit casing 40 in such a manner that the connector supporting member 53 lies along the upper surface of the drive unit casing 40 and that the coil connecting portions 51b, 52b are fitted into connector holes 42a, 42b formed in the upper surface of the drive unit casing 40, thereby forming part of the drive unit 101. With this arrangement, the casing-side generator connector 51 and the casing-side motor connector 52, when viewed from the direction of the axis, are disposed so as to lie along a tangent line Q passing through the upper end of the generator 20 and the electric motor 30, as shown in FIG. 4. In addition, the casing-side generator connector 51 and the casing-side motor connector 52, when viewed from the vertical direction, are disposed longitudinally such that the axis of rotation 0 of the rotor 21 of the generator 20 and the rotor 31 of the electric motor 30 lies therebetween, as shown in FIG. 11. Furthermore, in the drive unit casing 40, the coil terminals 23c for the various phases of the generator 20 are connected to the coil connecting terminals 51d of the casing-side generator connector 51, while the coil terminals 33c for the various phases of the electric motor 30 are connected to the coil connecting terminals 52d of the casing-side motor connector 52 (see FIG. 4).

Figure 8:
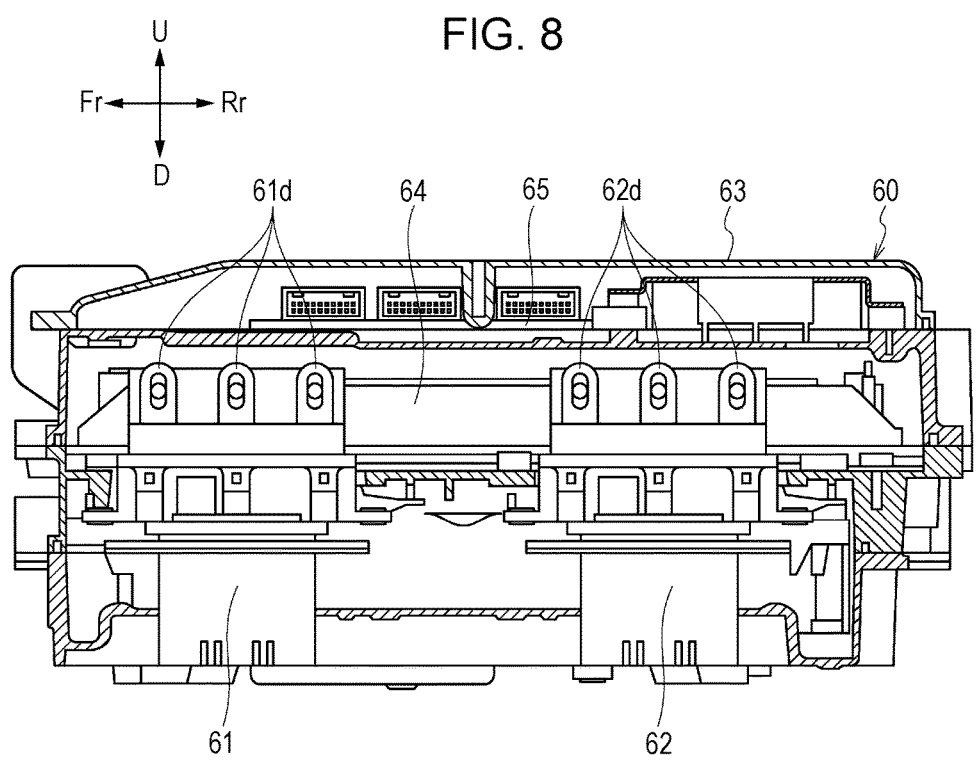
FIG. 8 is a cross-sectional view showing a power control unit of a hybrid vehicle drive unit of FIG. 1.

As shown in FIG. 8, the power control unit 60 according to the embodiment consists of a substantially box-shaped unit casing 63 having an inverter 64, a control unit (ECU) 65 that controls the inverter, and a current sensor (not illustrated) housed therein. The inverter 64 includes a generator inverter that is connected between a battery disposed outside the engine compartment and the generator 20 and that performs AC-DC voltage conversion and an electric motor inverter that is connected between the battery and the electric motor 30 and performs DC-AC voltage conversion.

Figure 9:
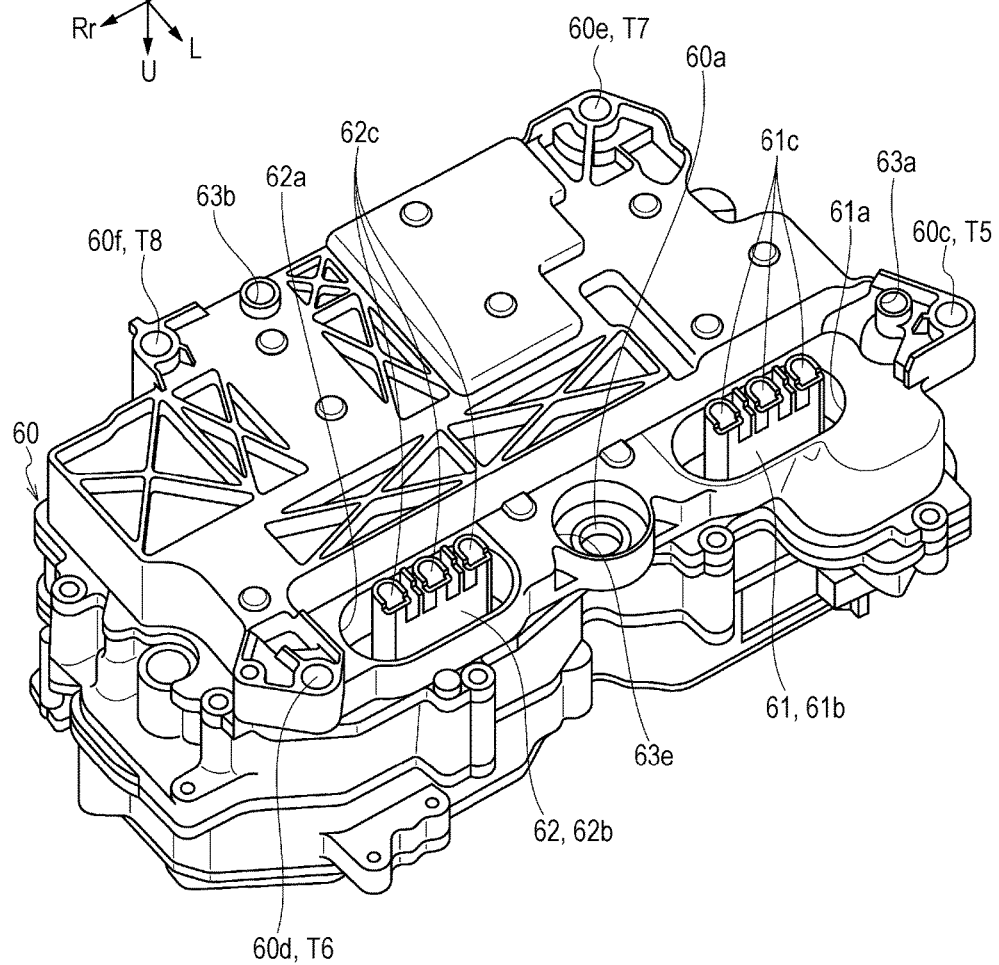
FIG. 9 is a perspective view showing a power control unit of a hybrid vehicle drive unit of FIG. 1, as viewed from the bottom.

As shown in FIGS. 4, 8, and 9, the power control unit 60 has a unit-side generator connector (controller connector) 61 and a unit-side motor connector (controller connector) 62 provided on a bottom thereof. Control of the generator 20 and the electric motor 30 through the power control unit 60 can be accomplished by electrically coupling the unit-side generator connector 61 and the unit-side motor connector 62 to the casing-side generator connector 51 and the casing-side motor connector 52, respectively.

Specifically, the unit-side generator connector 61 and the unit-side motor connector 62 have connectors 61b, 62b that protrude into oval-shaped mating holes 61a, 62a that are fitted on the connectors 51a, 52a of the casing-side generator connector 51 and the casing-side motor connector 52 and that are fitted into the connectors 51a, 52a of the casing-side generator connector 51 and the casing-side motor connector 52 and inverter connecting portions 61e, 62e located in the unit casing 63. The connectors 61b, 62b and the inverter connecting portions 61e, 62e have three unit-side connecting conductors 66, 67 corresponding to the U, V, and W phases housed thereinside. Connector terminals 61c, 62c for the three phases formed at ends of the unit-side connecting conductors 66, 67 that come into contact with the connector terminals 51c, 52c of the casing-side generator connector 51 and the casing-side motor connector 52 are disposed in the connectors 61b, 62b, while inverter connecting terminals 61d, 62d formed at the other ends of the unit-side connecting conductors 66, 67 are disposed in the inverter connecting portions 61e, 62e.

As shown in FIG. 4, a comparison of the casing-side generator connector 51 and the casing-side motor connector 52 with the unit-side generator connector 61 and the unit-side motor connector 62 shows that a clearance L1 between the coil connecting terminals 51d, 52d on the side opposite to the connector terminals 61c, 62c of the unit-side generator connector 61 and the unit-side motor connector 62 in the casing-side connecting conductors 54, 55 of the casing-side generator connector 51 and the casing-side motor connector 52 is smaller than a clearance L2 between the inverter connecting terminals 61d, 62d on the side opposite to the connector terminals 51c, 52c of the casing-side generator connector 51 and the casing-side motor connector 52 in the unit-side connecting conductors 66, 67 of the unit-side generator connector 61 and the unit-side motor connector 62. With this arrangement, the casing-side generator connector 51 and the casing-side motor connector 52 can be reduced in size, whereby the entire hybrid vehicle drive unit 100 having the box-shaped unit casing 63 placed on the cylindrically-shaped drive unit casing 40 can be reduced in size.

As shown in FIGS. 1, 4, 5, and 11, the power control unit 60 is secured at electrical connection fixing point K5 to the connector supporting member 53 mounted on the drive unit casing 40 that supports the casing-side generator connector 51 and the casing-side motor connector 52. Specifically, an insertion/extraction bolt 60b is inserted through a through-hole 60a formed in the power control unit 60 (see FIG. 7A) and fastened to a fastening hole 53a formed in the connector supporting member 53, thereby forming the fixing point K5 for electrical connection between the power control unit 60 and the connector supporting member 53.

Figure 10A:
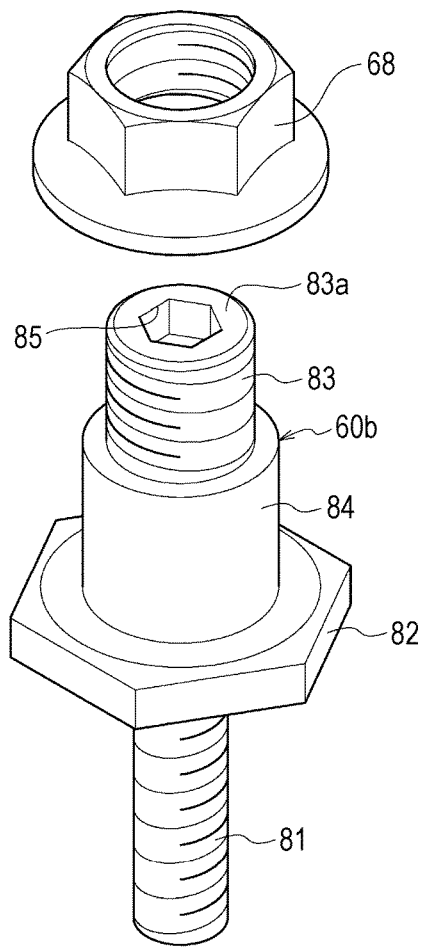
FIG. 10A is an exploded perspective view of a nut and an insertion/extraction bolt.
Figure 10B:
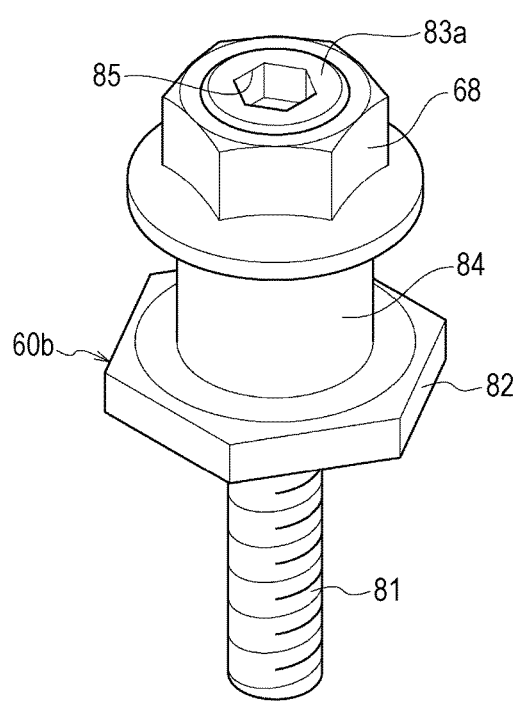
FIG. 10B is a perspective view of an insertion/extraction bolt having a nut fastened thereto.

As shown in FIGS. 10A and 10B, the insertion/extraction bolt 60b includes a threaded portion 81 having forward threads formed in an outer circumferential surface of a lower end thereof, a hexagonally-shaped spanner-fitting portion 82 that is located above and adjacent to the threaded portion 81 and is engaged with a spanner, a nut-screwing portion 83 that is formed on the opposite side of the threaded portion 81 with the spanner-fitting portion 82 therebetween and is screwed into a nut 68, a cylindrically-shaped coupling portion 84 that is provided between the spanner-fitting portion 82 and the nut-screwing portion 83, and a hexagonal wrench-fitting portion 85 that is formed in an upper end surface 83a of the nut-screwing portion 83 and is used for insertion into or extraction from the drive unit 101. The nut-screwing portion 83 has reverse threads formed on an outer circumferential surface that are threaded in the direction opposite to the direction of the threaded portion 81.

As shown in FIG. 9, a annular recess 63e is provided around the through-hole 60a of the power control unit 60 through which the insertion/extraction bolt 60b penetrates, while, as shown in FIG. 5, a cylindrically-shaped projection 53j to be housed in the annular recess 63e of the power control unit 60 is provided around the fastening hole 53a of the connector supporting member 53 to which the insertion/extraction bolt 60b is fastened.

In a state where the insertion/extraction bolt 60b supports the power control unit 60 between the nut 68 on the nut-screwing portion 83 and the spanner-fitting portion 82, the lower surface of the spanner-fitting portion 82 comes into contact with the cylindrically-shaped projection 53j in the connector supporting member 53 when the threaded portion 81 is fastened to the fastening hole 53a. The insertion/extraction bolt 60b has a function of ensuring that the connector terminals 51c, 52c of the casing-side generator connector 51 and the casing-side motor connector 52 are electrically connected to the connector terminals 61c, 62c of the unit-side generator connector 61 and the unit-side motor connector 62. The insertion/extraction bolt 60b being fastened to the fastening hole 53a will result in a coupled state in which the connector terminals 51c, 52c of the casing-side generator connector 51 and the casing-side motor connector 52 are electrically coupled to the connector terminals 61c, 62c of the unit-side generator connector 61 and the unit-side motor connector 62.

The coupling portion 84 is loosely fitted to the through-hole 60a due to having a smaller diameter than the through-hole 60a and is longer than the wall thickness of the power control unit 60 in which the through-hole 60 is formed, allowing a relative movement between the insertion/extraction bolt 60b and the power control unit 60. In addition, a distance in which such a relative movement is allowed is configured to be shorter than a length of threads where the threaded portion 81 is threaded into the fastening hole 53a of the connector supporting member 53.

Furthermore, as shown in FIGS. 5, 9, and 11, the power control unit 60 is secured to the drive unit casing 40 with at least four bolts. Specifically, bolts 60g, 60h, 60i, 60j are fastened to fastening holes 42g, 42h, 42i, 42j formed in the drive unit casing 40 through through-holes 60c, 60d, 60e, 60f formed in the power control unit 60, thereby forming bolt fastening points T5, T6, T7, T8 between the power control unit 60 and the drive unit casing 40. The bolts 60g, 60h, 60i, 60j have a function of ensuring that the power-control unit 60 and the drive unit casing 40 are mechanically connected to each other. The bolts 60g, 60h, 60i, 60j being fastened to the fastening holes 42g, 42h, 42i, 42j will result in a coupled state in which the power control unit 60 and the drive unit casing 40 are mechanically coupled to each other.

In other words, the power control unit 60 and the drive unit 101 are held in the coupled state in which electrical coupling is accomplished by the insertion/extraction bolt 60b as well as in the coupled state in which mechanical coupling is accomplished by the bolts 60g, 60h, 60i, 60j that are fastened in the same direction as the direction in which the insertion/extraction bolt 60b is fastened.

Bosses in which the through-holes 60c, 60d, 60e, 60f are formed project slightly downward from the bottom surface of the power control unit 60 and are in contact with the drive unit casing 40. The four bolt fastening points T5, T6, T7, T8 are disposed so as to surround the casing-side generator connector 51 and the casing-side motor connector 52 in a rectangular shape. With this arrangement, the integration of the power control unit 60 and the drive unit casing 40 accomplished by bolt fastening improves the stiffness of the drive unit casing 40, thereby further deadening the vibrations of the drive unit casing 40. By causing the bolts 60g, 60h, 60i, 60j to be fastened, the power control unit 60 is supported so as to float between the nut 68 and the spanner-fitting portion 82 (see FIG. 12C).

As shown in FIGS. 5 through 7C, the drive unit casing 40 has a power control unit mounting portion 42k formed on a top surface thereof. The power control unit 60 allows only the bosses in which the through-holes 60c, 60d, 60e, 60f are formed to be in contact with the power control unit mounting portion 42k and, when mounted on the power control unit mounting portion 42k with a space therebetween, is secured by bolt fastening to the drive unit casing 40 and the connector supporting member 53.

Figure 6A:
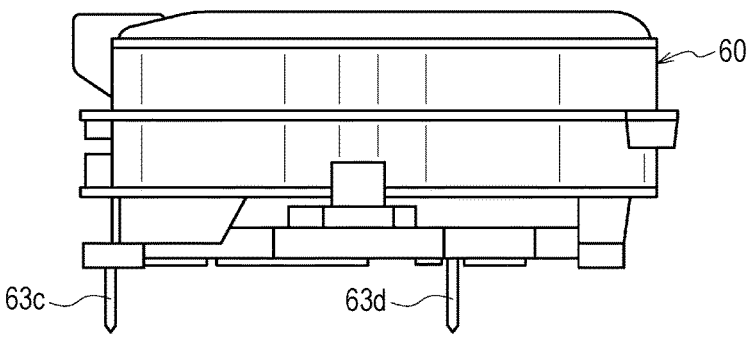
FIG. 6A is a side view of a power control unit.
Figure 6B:
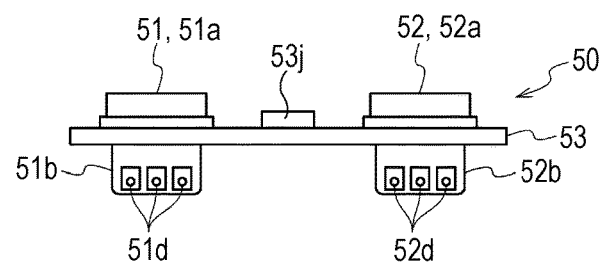
FIG. 6B is a side view of a casing-side connector.
Figure 6C:
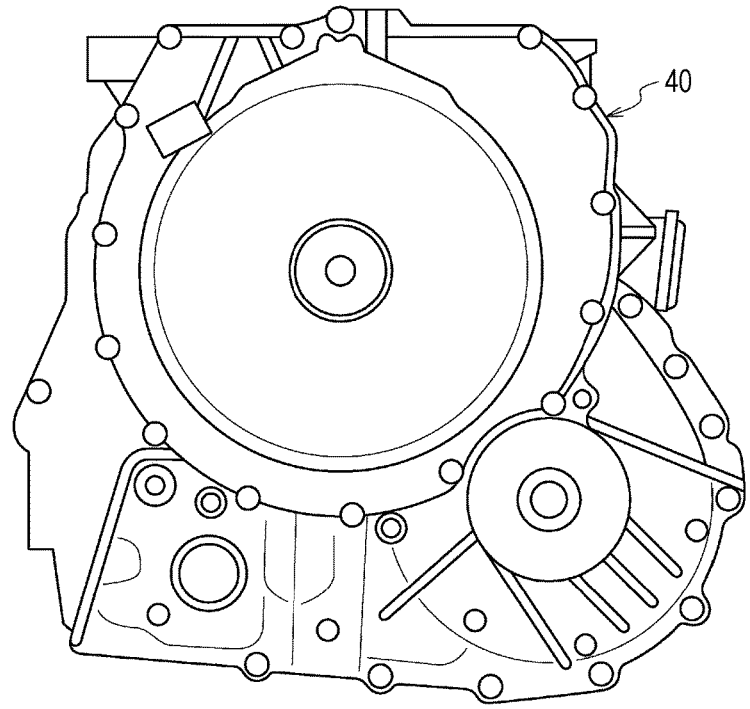
FIG. 6C is a side view of a drive unit casing.
Figure 7A:
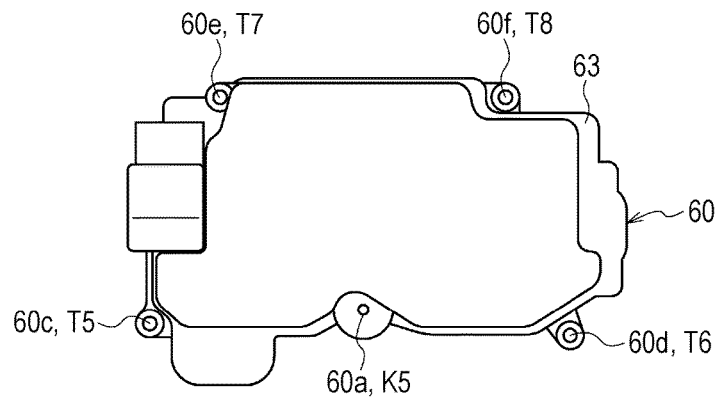
FIG. 7A is a plan view of a power control unit.
Figure 7B:
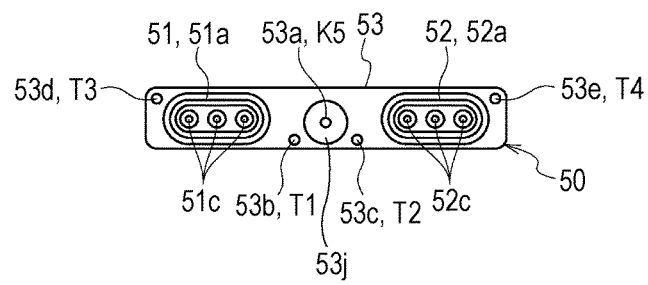
FIG. 7B is a plan view of a casing-side connector.
Figure 7C:
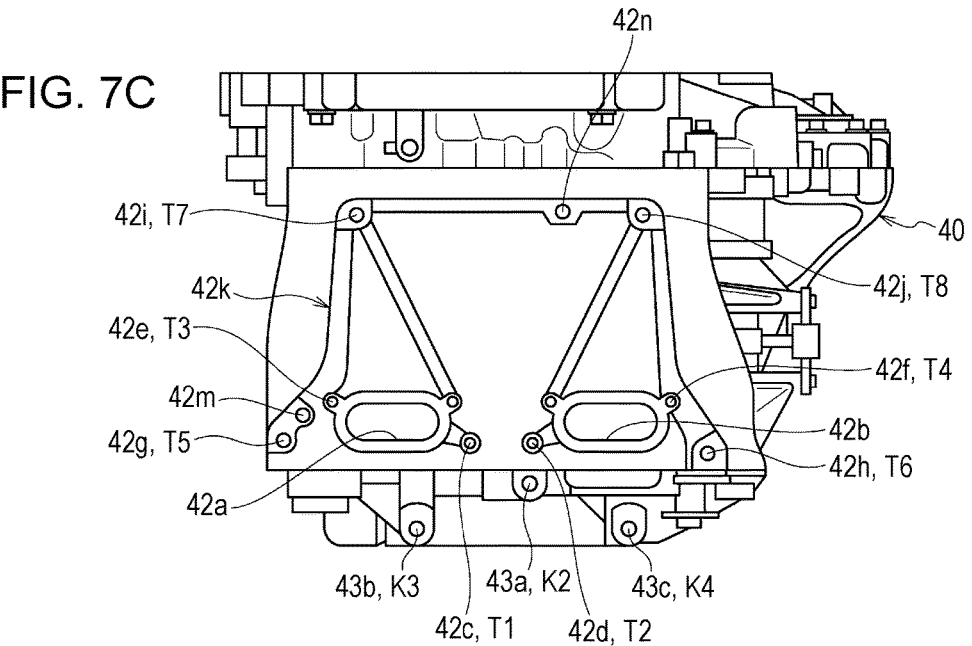
FIG. 7C is a plan view of a drive unit casing.

In addition, as shown in FIG. 9, the power control unit 60 has guide pin fixing holes 63a, 63b formed in the vicinity of the through-hole 60c and the through hole 60f, into which guide pins 63c, 63d are screwed from the bottom surface side of the power control unit 60 (see FIG. 6A). The guide pins 63c, 63d projecting from the bottom surface of the power control unit 60 are inserted into guide holes 42m, 42n in the drive unit casing 40 when the power control unit 60 is placed onto the top surface of the drive unit casing 40 (see FIG. 5). The guide pins 63c, 63d and the guide holes 42m, 42n have a function of restricting a relative position between the power control unit 60 and the drive unit casing 40 and guiding the power control unit 60.

As shown in FIG. 11, the drive unit 101 having the power control unit 60 mounted thereon has the drive unit casing 40 secured to a vehicle body frame 80 via a mounting member 70. The mounting member 70 includes a vehicle-side mounting member 71 secured to the vehicle body frame 80, a casing-side mounting member 72 secured to an upper outer end of the drive unit casing 40, and a vibration-deadening member (not illustrated) that couples the vehicle-side mounting member 71 and the casing-side mounting member 72 to each other. The vehicle-side mounting member 71 is secured to the vehicle body frame 80 with a bolt 71a, while the casing-side mounting member 72 is secured to the drive unit casing 40 with bolts 72a, 72b, 72c.

The bolt 71a is fastened to a fastening hole (not illustrated) formed in the vehicle body frame 80 via a through-hole (not illustrated) formed in the vehicle-side mounting member 71, thereby forming a fixing point K1 between the mounting member 70 and the vehicle body frame 80, while the bolts 72a, 72b, 72c are fastened to fastening holes 43a, 43b, 43c (see FIGS. 1 and 7C) formed in the drive unit casing 40 via a through-hole (not illustrated) formed in the casing-side mounting member 72, thereby forming fixing points K2, K3, K4 between the mounting member 70 and the drive unit casing 40. The drive unit casing 40 is secured at another portion thereof to the vehicle body frame 80 via a mounting member 70, but descriptions about such other portions are omitted.

<Installation>

Next, how to install the power control unit 60 on the drive unit 101 will be described below with reference to FIGS. 12A through 12C.

First, the insertion/extraction bolt 60b is inserted into the through-hole 60a through the annular recess 63e formed in the bottom surface of the power control unit 60. Second, while rotation of the insertion/extraction bolt 60b is restricted by a spanner (not illustrated) engaged with the spanner-fitting portion 82, the nut 68 is turned counterclockwise (in the direction in which the reverse-threaded bolt is tightened), causing the nut 68 to be screwed into the nut-screwing portion 83 that projects from the through-hole 60a. At this time, the insertion/extraction bolt 60b is loose relative to the power control unit 60 between the nut 68 and the spanner-fitting portion 82, allowing a relative movement between the insertion/extraction bolt 60b and the power control unit 60.

Next, the power control unit 60 is placed onto the drive unit casing 40 while paying attention to aligning the guide pins 63c, 63d projecting from the bottom surface of the power control unit 60 with the guide holes 42m, 42n of the drive unit casing 40. As shown in FIG. 12A, when the threaded portion 81 comes into contact with the cylindrically-shaped projection 53j, a hexagonal wrench (not illustrated) is engaged with the hexagonal wrench-fitting portion 85 of the insertion/extraction bolt 60b and is turned clockwise (in the direction in which a forward-threaded bolt is tightened), causing the threaded portion 81 to be screwed into the fastening hole 53a formed in the connector supporting member 53. In conjunction with this, the connectors 61b, 62b of the unit-side generator connector 61 and the unit-side motor connector 62 are mated with the connectors 51a, 52a of the casing-side generator connector 51 and the casing-side motor connector 52, causing the connector terminals 61c, 62c to come into contact with the connector terminals 51c, 52c.

Although the bottom surface of the nut 68 is in sliding contact with a top surface 63f of the unit casing 63 while the hexagonal wrench is being turned, turning the hexagonal wrench clockwise or in the forward direction does not loosen the nut 68, but tightens the nut 68 due to reverse threads formed in the nut-screwing portion 83. As shown in FIG. 12B, the lower surface of the spanner-fitting portion 82 being in contact with the cylindrically-shaped projection 53j of the connector supporting member 53 ensures an electrical connection between the connector terminals 61c, 62c and the connector terminals 51c, 52c. In other words, distance H1 shown in FIG. 12B between the power control unit 60 and the drive unit 101 becomes a distance that ensures the electrical connection.

Next, when the bolts 60g, 60h, 60i, 60j are fastened to the fastening holes 42g, 42h, 42i, 42j formed in the drive unit casing 40 through the through-holes 60c, 60d, 60e, 60f formed in the power control unit 60, the power control unit 60 moves downward in relation to the insertion/extraction bolt 60b, causing lower surfaces of the bosses in which the through-holes 60c, 60d, 60e, 60f are formed to come into contact with the drive unit casing 40. This leads to a coupled state in which the power control unit 60 and the drive unit casing 40 are mechanically coupled to each other. In other words, fastening the bolts 60g, 60h, 60i, 60j causes distance H1 shown in FIG. 12B between the power control unit 60 and the drive unit 101 to gradually become closer to distance H2 shown in FIG. 12C, ensuring the mechanical coupling.

A distance in which a relative movement between the insertion/extraction bolt 60b and the power control unit 60 is allowed is configured to be longer than a distance of movement of the power control unit 60 resulting from fastening of the bolts 60g, 60h, 60i, 60j. Thus, this distance is configured not to impede the mechanical coupling. In conjunction with this relative movement, the connectors 61b, 62b of the unit-side generator connector 61 and the unit-side motor connector 62 and the connectors 51a, 52a of the casing-side generator connector 51 and the casing-side motor connector 52 are more deeply engaged with each other, while the connector terminals 51c, 52c are more deeply inserted into the connector terminals 61c, 62c, thereby ensuring the electrical coupling.

<Removal>

To remove the power control unit 60 from the drive unit 101, the installation procedure is reversed. In other words, removing the bolts 60g, 60h, 60i, 60j that mechanically couple the power control unit 60 and the drive unit casing 40 to each other is followed by removing from the fastening hole 53a in the connector supporting member 53 the insertion/extraction bolt 60b that ensures an electrical coupling between the connector terminals 61c, 62c of the unit-side generator connector 61 and the unit-side motor connector 62 and the connector terminals 51c, 52c of the casing-side generator connector 51 and the casing-side motor connector 52, thereby enabling removal of the power control unit 60 from the drive unit 101. To isolate the insertion/extraction bolt 60b from the power control unit 60, the insertion/extraction bolt 60b is first removed from the fastening hole 53a of the connector supporting member 53 with a hexagonal wrench engaged with the hexagonal wrench-fitting portion 85 and then the nut 68 is unscrewed.

<Erroneous Operation Prevention Mechanism>

An erroneous operation prevention mechanism will be described below that can be additionally used to prevent erroneous disassembly when the power control unit 60 is decoupled from the drive unit 101.

As described above, to decouple the insertion/extraction bolt 60b from the power control unit 60, removal of the insertion/extraction bolt 60b from the fastening hole 53a of the connector supporting member 53 with a hexagonal wrench engaged with the hexagonal wrench-fitting portion 85 is followed by removal of the nut 68. A first restricting member that prevents these steps from being erroneously performed will be described below.

Figure 13:
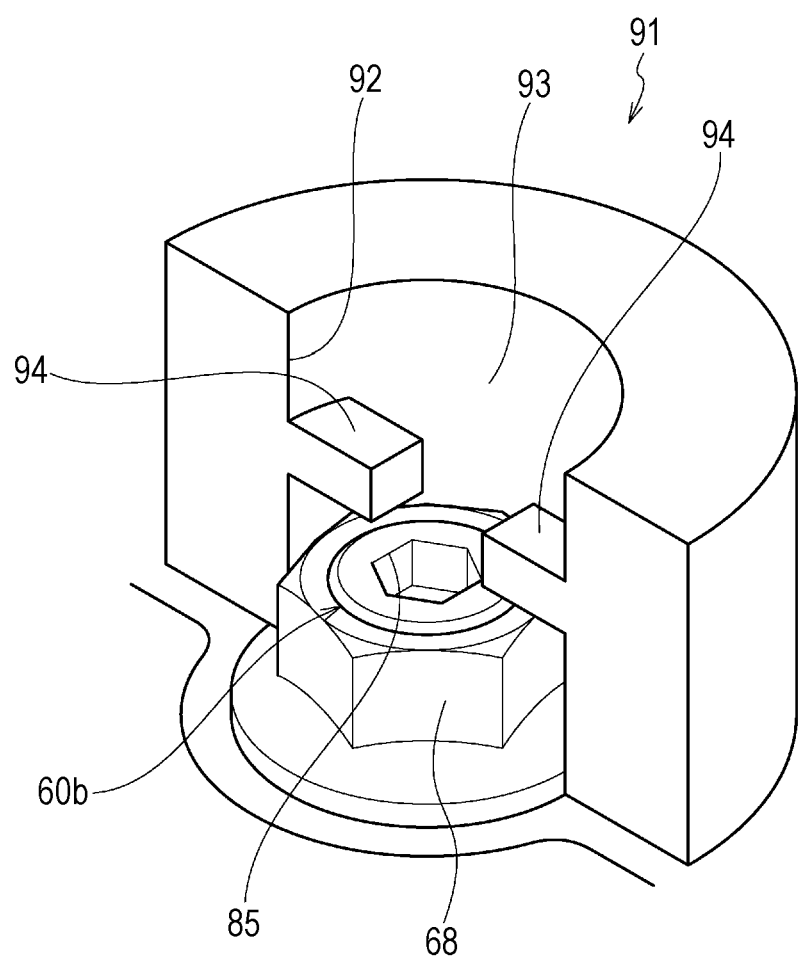
FIG. 13 is a perspective view showing surroundings of an insertion/extraction bolt having a first restricting member provided thereon.

As shown in FIG. 13, the first restricting member 91 is a semi-cylindrical cap that partially covers an outer circumference of the nut 68 mounted on the nut-screwing portion 83 of the insertion/extraction bolt 60b and has access prevention projections 94 extending inward from both ends of an inner wall 93 dividing a through-hole 92 with the insertion/extraction bolt 60b therebetween. A gap between the access prevention projections 94 is configured to be larger than the hexagonal wrench-fitting portion 85, but smaller than the width of the nut 68, which allows a hexagonal wrench to be engaged with the hexagonal wrench-fitting portion 85 via the through-hole 92, but which prevents any spanner or wrench from being engaged with the hexagonal wrench-fitting portion 85. As described above, while the insertion/extraction bolt 60b is mounted on the connector supporting member 53 of the drive unit 101, the first restricting member 91 restricts access to the nut 68 screwed into the nut-screwing portion 83 and allows access to the hexagonal wrench-fitting portion 85, thereby preventing the nut 68 from being removed from the insertion/extraction bolt 60b before the insertion/extraction bolt 60b is removed from the fastening hole 53a of the connector supporting member 53 with a hexagonal wrench engaged with the hexagonal wrench-fitting portion 85.

Next, a second restricting member 95 will be described below. As described above, to decouple the power control unit 60 from the drive unit 101, the bolts 60g, 60h, 60i, 60j and then the insertion/extraction bolt 60b are removed. The second restricting member 95 is configured to prevent these steps from being erroneously performed.

Figure 14:
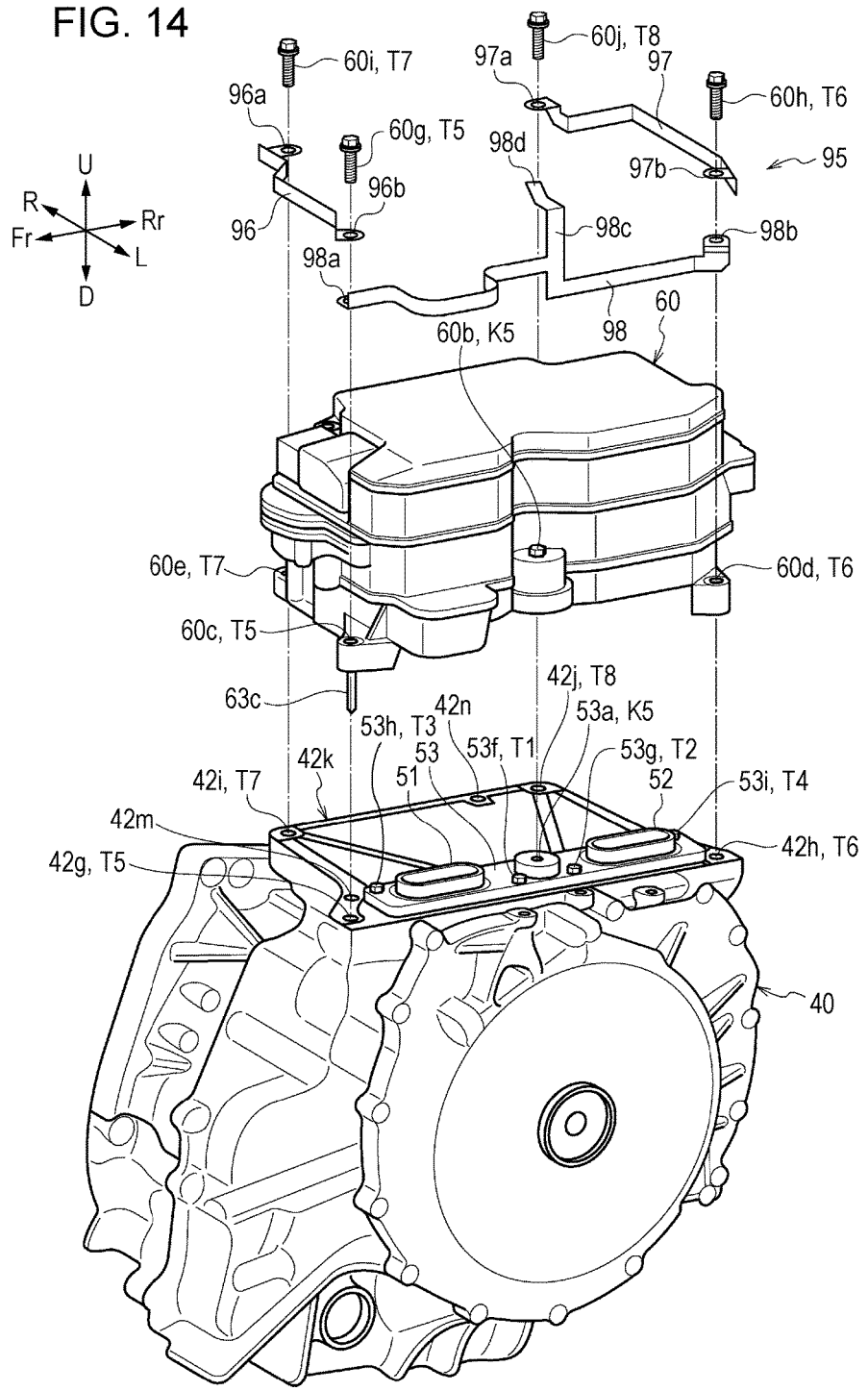
FIG. 14 is an exploded perspective view of a hybrid vehicle drive unit having a second restricting member provided thereon.
Figure 15:
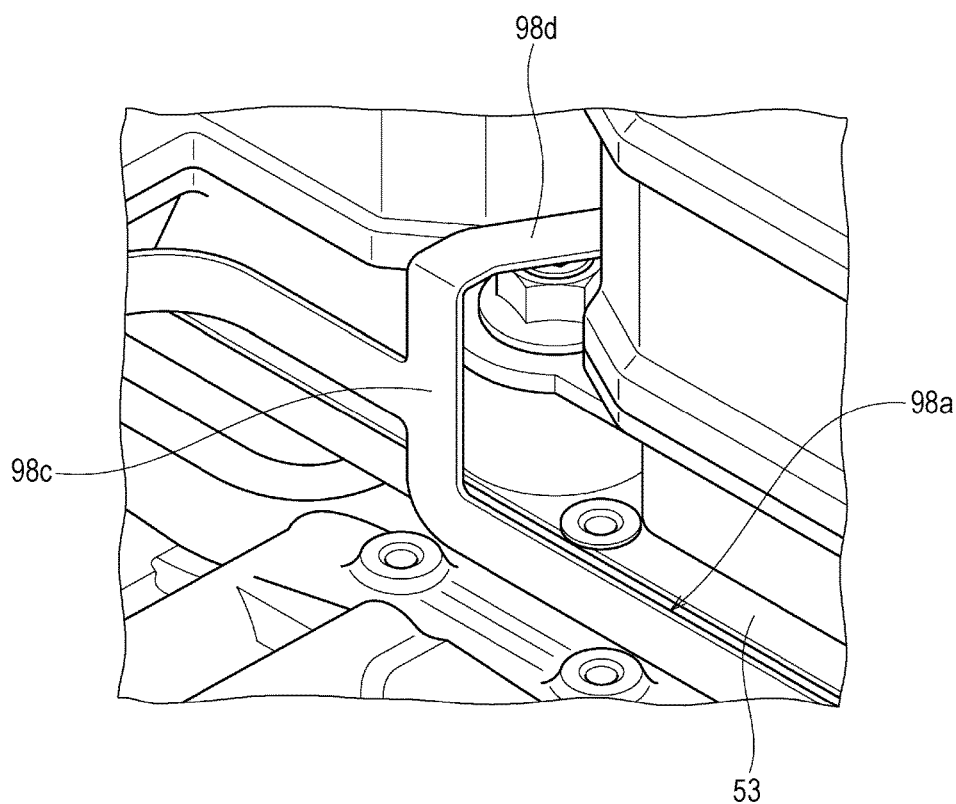
FIG. 15 is a partially expanded view showing surroundings of an access prevention piece.

As shown in FIGS. 14 and 15, the second restricting member 95 consists of a front plate 96, a rear plate 97, and a side plate 98, all of which are a thin plate-like component. The front plate 96 has a through-hole 96a through which the bolt 60i passes formed at an end thereof, the through-hole 96a being communicated with the through-hole 60e of the power control unit 60 and the fastening hole 42i of the drive unit casing 40 and has a through-hole 96b through which the bolt 60g passes formed at the other end thereof, the through-hole 96b being communicated with the through-hole 60c of the power control unit 60 and the fastening hole 42g of the drive unit casing 40. The rear plate 97 has a through-hole 97a through which the bolt 60j passes formed at an end thereof, the through-hole 97a being communicated with the through-hole 60f of the power control unit 60 and the fastening hole 42j of the drive unit casing 40 and has a through-hole 97b through which the bolt 60h passes formed at the other end thereof, the through-hole 97b being communicated with the through-hole 60d of the power control unit 60 and the fastening hole 42h of the drive unit casing 40.

The side plate 98 has a through-hole 98a through which the bolt 60g passes formed at an end thereof, the through-hole 98a being communicated with the through-hole 60c of the power control unit 60 and the fastening hole 42g of the drive unit casing 40 and has a through-hole 98b through which the bolt 60h passes formed at the other end thereof, the through-hole 98b being communicated with the through-hole 60d of the power control unit 60 and the fastening hole 42h of the drive unit casing 40. The side plate 98 has an extending portion 98c vertically extending upward formed substantially at the center thereof. The extending portion 98c has an access prevention piece 98d formed at an end thereof that covers the insertion/extraction bolt 60b and the nut 68 from above.

The front plate 96 and the rear plate 97 of the second restricting member 95 are partly laid over the side plate 98, while the front plate 96, the rear plate 97, and the side plate 98 are fastened together with the bolts 60g, 60h, 60i, 60j. Accordingly, the side plate 98 cannot be removed without removing the front plate 96 and the rear plate 97. With this arrangement, access to the nut 68 or the hexagonal wrench-fitting portion 85 is not allowed unless all of the bolts 60g, 60h, 60i, 60j are removed, since the access prevention piece 98d covers the insertion/extraction bolt 60b and the nut 68. As described above, in a coupled state in which the bolts 60g, 60h, 60i, 60j couple the power control unit 60 and the drive unit 101 to each other, access to the hexagonal wrench-fitting portion 85 is restricted, thereby preventing removal of the insertion/extraction bolt 60b before removal of the bolts 60g, 60h, 60i, 60j. Also, the access prevention piece 98d may be configured to cover the first restricting member 91, which can prevent both of the erroneous operations described above.

As described above, the power control unit 60 and the drive unit 101 according to this embodiment are kept in a coupled state in which electrical coupling is accomplished by the insertion/extraction bolt 60b as well as in a coupled state in which mechanical coupling is accomplished by the bolts 60g, 60h, 60i, 60j that are different from the insertion/extraction bolt 60b. Thus, the insertion/extraction bolt 60b and the bolts 60g, 60h, 60i, 60j are configured to provide different functions, thereby ensuring that electrical coupling and mechanical coupling are accomplished.

The direction in which the insertion/extraction bolt 60b is tightened is the same as the direction in which the bolts 60g, 60h, 60i, 60j are fixed. A distance between the power control unit 60 and the drive unit 101 is maintained by the insertion/extraction bolt 60b at distance H1 that ensures the electrical coupling. After that, the distance between the power control unit 60 and the drive unit 101 is shortened by the bolts 60g, 60h, 60i, 60j to a distance smaller than distance H1 at which the mechanical coupling is accomplished. With this arrangement, while the electrical coupling is maintained, the mechanical coupling can be accomplished, thereby ensuring both electrical coupling and mechanical coupling are accomplished.

The insertion/extraction bolt 60b is mounted in the power control unit 60 in such a manner that a relative movement is allowed, while a distance in which such a relative movement is allowed is configured to be longer than the distance which the power control unit 60 and the drive unit 101 move from distance H1 that ensures electrical coupling to a distance that ensures mechanical coupling. With this arrangement, the mechanical coupling is not impeded by an interaction between the insertion/extraction bolt 60b and the power control unit 60.

The present application is typically described with reference to, but not limited to, the foregoing embodiments. Various modifications are conceivable within the scope of the present application. The above embodiment describes the hybrid vehicle drive unit 100 as an example of the integrated unit which includes the drive unit 101 having the drive unit casing 40 that has the generator 20 and the electric motor 30 housed therein, the engine 4, and the power control unit 60 that is mounted on the drive unit casing 40 having the generator 20 and the electric motor 30 housed therein and that controls the generator 20 and the electric motor 30, but is not limited to this. The integrated unit may be a vehicle drive unit that is structured independently of the engine or has no engine provided therein.

The above embodiment describes the drive unit 101 having the generator 20 and the electric motor 30 housed therein as a controlled unit (drive device), but the drive unit 101 does not necessarily include both and may include any one or both of generator and motor functions of electric rotating machines. In addition, the integrated unit is not limited to those designed for vehicles and may be those for other transportation machines. Furthermore, in the above embodiment, the threaded portion 81 includes forward threads, while the nut-screwing portion 83 includes reverse threads, but the threaded portion 81 may include reverse threads, while the nut-screwing portion 83 may have forward threads. Also, in the above embodiment, the first tool includes a spanner, but not limited to this. Other type of tool may be used. Furthermore, in the above embodiment, contact of the lower surface of the spanner-fitting portion 82 with the cylindrically-shaped projection 53j in the connector supporting member 53 is configured to ensure the electrical coupling, but the insertion/extraction bolt 60b may have an abutting portion that abuts against the cylindrically-shaped projection 53j, apart from the spanner-fitting portion 82. In the above embodiment, the second tool includes a hexagonal wrench, but not limited to this. Other type of tool may be used.

A first aspect of the present application provides an integrated unit (for example, a hybrid vehicle control unit 100 in an embodiment to be described later) which includes a control unit (for example, a power control unit 60 in the embodiment) having a control unit connector (for example, a unit-side generator connector 61 and a unit-side electric motor connector 62 in the embodiment) and a controlled unit (for example, a drive unit 101 in the embodiment) that has a controlled unit connector (for example, a casing-side connector 50 in the embodiment) that is fitted into the control unit connector and is electrically coupled to the control unit by causing the control unit connector and the controlled unit connector to be fitted into each other, in which the control unit and the controlled unit are maintained in a coupled state in which electrical coupling between the control unit and the controlled unit is accomplished by a fastening supporting member (for example, an insertion/extraction bolt 60b) as well as in a coupled state in which mechanical coupling between the control unit and the controlled unit is accomplished by a fixing member (for example, bolts 60g, 60h, 60i, 60j) that differs from the fastening supporting member. With this arrangement, the fastening supporting member and the fixing member are configured to provide different functions, thereby ensuring that both electrical coupling and mechanical coupling are accomplished.

A second aspect of the present application provides the integrated unit of the first aspect, in which a direction in which the fastening supporting member is fastened may be substantially equal to a direction in which the fixing member is fixed, and in which a distance between the control unit and the controlled unit may be maintained by the fastening supporting member at a predetermined distance (for example, distance H1 in the embodiment) that ensures electrical coupling and, after that, the distance between the control unit and the controlled unit may be shortened by the fixing member to a distance shorter than the predetermined distance whereby mechanical coupling is accomplished. With this arrangement, while electrical coupling is maintained, mechanical coupling can be accomplished, thereby ensuring that both electrical coupling and mechanical coupling are accomplished.

A third aspect of the present application provides the integrated unit of the second aspect, in which the fastening supporting member may be mounted on the control unit in such a manner that a relative movement is allowed and in which a distance in which the relative movement is allowed may be longer than a distance which the control unit and the controlled unit move from the predetermined distance that ensures electrical coupling to a distance that ensures mechanical coupling. With this arrangement, mechanical coupling is not impeded by an interaction between the fastening supporting member and the control unit.

Obviously, numerous modifications and variations of the present invention are possible in light of the above teachings. It is therefore to be understood that within the scope of the appended claims, the invention may be practiced otherwise than as specifically described herein.

What is claimed is:
1. An integrated unit comprising:
a control unit having a control unit connector; and
a controlled unit that has a controlled unit connector that is fitted into the control unit connector and is electrically coupled to the control unit by causing the control unit connector and the controlled unit connector to be fitted into each other,
wherein the control unit and the controlled unit are maintained in a coupled state in which electrical coupling is accomplished by a fastening supporting member as well as in a coupled state in which mechanical coupling is accomplished by a fixing member that differs from the fastening supporting member, and
wherein the fastening supporting member is rotatable relative to the control unit to thereby ensure that the control unit is electrically coupled to the controlled unit.
2. The integrated unit according to claim 1,
wherein the fastening supporting member is movable with respect to the control unit in a direction in which the fastening supporting member is fastened.
3. The integrated unit according to claim 1,
wherein the controlled unit includes an electric rotating machine having a rotor and a stator disposed so as to be opposed to each other, and
wherein the control unit controls the electric rotating machine.
4. The integrated unit according to claim 1,
wherein the fastening supporting member is rotatable relative to the control unit to thereby increase an overlap between a portion of the controller connector and a terminal connected to the controlled unit.
5. The integrated unit according to claim 4,
wherein the portion of the controller connector is a terminal of the controller connector that is electrically connected to the terminal connected to the controlled unit.
6. An integrated unit comprising:
a control unit having a control unit connector; and
a controlled unit that has a controlled unit connector that is fitted into the control unit connector and is electrically coupled to the control unit by causing the control unit connector and the controlled unit connector to be fitted into each other, wherein the control unit and the controlled unit are maintained in a coupled state in which electrical coupling is accomplished by a fastening supporting member as well as in a coupled state in which mechanical coupling is accomplished by a fixing member that differs from the fastening supporting member, wherein a direction in which the fastening supporting member is fastened is substantially equal to a direction in which the fixing member is fixed; and wherein a distance between the control unit and the controlled unit is maintained by the fastening supporting member at a predetermined distance that ensures electrical coupling and, after that, the distance between the control unit and the controlled unit is shortened by the fixing member to a distance shorter than the predetermined distance whereby mechanical coupling is accomplished.

7. The integrated unit according to claim 6, wherein the fastening supporting member is mounted on the control unit in such a manner that a relative movement is allowed; and wherein a distance in which the relative movement is allowed is longer than a distance which the control unit and the controlled unit move from the predetermined distance that ensures electrical coupling to a distance that ensures mechanical coupling.

8. An integrated system comprising:

a controller having a controller connector;

a drive device having a drive device connector that is connected to the controller connector so that the drive device is electrically coupled to the controller;

a fastening supporting member via which the controller and the drive device are maintained in an electrically coupled state in which the drive device connector is connected to the controller connector; and a fixing member via which the controller and the drive device are maintained in a mechanically coupled state in which the drive device is mechanically coupled to the controller, wherein the fastening supporting member is rotatable relative to the controller to thereby ensure that the controller is electrically coupled to the drive device.

9. The integrated system according to claim 8, wherein the fastening supporting member is movable with respect to the controller in a direction in which the fastening supporting member is fastened.

10. The integrated system according to claim 8, wherein the drive device includes an electric rotating machine having a rotor and a stator disposed so as to be opposed to each other, and wherein the controller controls the electric rotating machine.

11. The integrated system according to claim 8, wherein the fastening supporting member is rotatable relative to the controller to thereby increase an overlap between a portion of the controller connector and a terminal connected to the drive device.

12. The integrated system according to claim 11, wherein the portion of the controller connector is a terminal of the controller connector that is electrically connected to the terminal connected to the controlled unit.

13. An integrated system comprising:

a controller having a controller connector;

a drive device having a drive device connector that is connected to the controller connector so that the drive device is electrically coupled to the controller;

a fastening supporting member via which the controller and the drive device are maintained in an electrically coupled state in which the drive device connector is connected to the controller connector; and a fixing member via which the controller and the drive device are maintained in a mechanically coupled state in which the drive device is mechanically coupled to the controller, wherein a direction in which the fastening supporting member is fastened is substantially equal to a direction in which the fixing member is fixed; and wherein a distance between the controller and the drive device is maintained via the fastening supporting member at a predetermined distance in which the controller and the drive device are in the electrically coupled state and, after that, the distance between the controller and the drive device is shortened via the fixing member to a distance shorter than the predetermined distance so that the controller and the drive device are in the mechanically coupled state.

14. The integrated system according to claim 13, wherein the fastening supporting member is mounted on the controller so that a relative movement is allowed; and wherein a distance in which the relative movement is allowed is longer than a distance which the controller and the drive device move from the predetermined distance in which the controller and the drive device are in the electrically coupled state to a distance in which the controller and the drive device are in the mechanically coupled state.

* * * * *